(12) United States Patent
Suzuki et al.

(10) Patent No.: US 9,575,702 B2
(45) Date of Patent: Feb. 21, 2017

(54) INFORMATION PROCESSING APPARATUS, INFORMATION PROCESSING METHOD, AND STORAGE MEDIUM STORING PROGRAM HAVING A LAYERED STRUCTURE

(71) Applicant: CANON KABUSHIKI KAISHA, Tokyo (JP)

(72) Inventors: Tomohiro Suzuki, Kawasaki (JP); Naoki Sumi, Kawasaki (JP); Kiyoshi Umeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/739,196

(22) Filed: Jun. 15, 2015

(65) Prior Publication Data

US 2015/0379380 A1    Dec. 31, 2015

(30) Foreign Application Priority Data

Jun. 30, 2014 (JP) .................................. 2014-135180

(51) Int. Cl.
*G06F 3/12* (2006.01)

(52) U.S. Cl.
CPC ........... *G06F 3/1292* (2013.01); *G06F 3/1208* (2013.01); *G06F 3/1247* (2013.01); *G06F 3/1256* (2013.01)

(58) Field of Classification Search
None
See application file for complete search history.

(56) References Cited

U.S. PATENT DOCUMENTS

| 6,891,970 | B1 | 5/2005 | Suzuki |
| 8,873,090 | B2 | 10/2014 | Nakagawa |
| 2010/0149091 | A1* | 6/2010 | Kota ........................ G06T 11/00 345/156 |
| 2014/0009495 | A1 | 1/2014 | Sakai et al. |
| 2014/0010444 | A1 | 1/2014 | Sasaki et al. |
| 2014/0010459 | A1 | 1/2014 | Sumi et al. |
| 2015/0009537 | A1 | 1/2015 | Nakagawa |

FOREIGN PATENT DOCUMENTS

JP    2011-233034 A    11/2011

* cited by examiner

*Primary Examiner* — Christopher D Wait
(74) *Attorney, Agent, or Firm* — Fitzpatrick, Cella, Harper & Scinto

(57) ABSTRACT

When printing an image displayed by the function of an application, rendering information for rendering an object is determined based on drawing information including the drawing position and size of the object of the image in a first layer constituted by a script instruction set which is translated to be able to execute the script instruction set by a processor when executing the application and is executed by the processor. The object is rendered in accordance with the determined rendering information in a second layer constituted by an instruction set which is translated in advance to be able to execute the instruction set by the processor.

20 Claims, 12 Drawing Sheets

INFORMATION PROCESSING APPARATUS, INFORMATION PROCESSING METHOD, AND STORAGE MEDIUM STORING PROGRAM HAVING A LAYERED STRUCTURE

BACKGROUND OF THE INVENTION

Field of the Invention

The present invention relates to an information processing apparatus and information processing method for performing image processing, and a storage medium storing a program.

Description of the Related Art

In recent years, multi-function mobile phones (to be referred to as mobile computers hereinafter) incorporating a camera function have become widespread, and far surpass digital cameras and conventional personal computers (to be referred to as PCs hereinafter) in sales. The system of such a mobile computer is basically formed from three elements, that is, hardware as the computer itself, an operating system (to be referred to as an OS hereinafter) operating on the hardware, and an application operating on the OS. The user can activate a map, mail, or browser by using the application, and perform an operation such as browsing of a Web site on the Internet. As examples of the form of such an application operating on the mobile computer, there are mainly two application forms, that is, a native application and a Web application. The features of each application will be explained below.

The native application is normally developed in a development environment and development language which are prepared for each OS. For example, the C/C++ language is used on an OS provided by company A, the Java® language is used on an OS provided by company B, and a different development language is used on an OS provided by company C. In this way, the native application is developed in a different development language for each OS. The native application is compiled in advance in each development environment, and converted by an assembler from a so-called high-level language understandable by a human into instruction sets interpretable by the CPU of the computer. Thus, the native application has an advantage that a high-speed operation is possible because the CPU directly interprets instructions.

The Web application is an application operating on a Web browser which is normally incorporated in an OS on a computer. The Web application is generally developed using a language such as HTML5, CSS, or JavaScript® so as to enable interpretation by the Web browser. These languages are Web standard languages. Thus, once the application is described, it can operate in any environment where the Web browser operates. Japanese Patent Laid-Open No. 2011-233034 discloses an example of the Web application form. The body of the Web application described in HTML5, CSS, or JavaScript resides in a server outside a mobile computer. Since the Web application is downloaded from the server to the mobile computer via Internet connection at the time of use, the user can dynamically change a user interface (UI) design or the like without compiling the application in advance.

It is often the case recently that a mobile computer is equipped with a high-resolution camera. Since the mobile computer is carried daily and includes a memory capable of storing about several thousand photos, the user can casually enjoy photo shooting frequently. Image processing is very important for the user in order to perform filter processing for converting a photo image into, for example, a monochrome or sepia, or solve a problem that a photo is dark or the color balance is poor. The image processing is becoming an indispensable application. It is important in the application that such image processing can be simply provided to the user in a stress-free manner.

Generally, the Web application is executed by JavaScript on a browser or on a server under the security restriction on the browser. Conventionally, JavaScript is described as a script of a character string visually recognizable by a human, and can be executed by compiling the script at the time of the operation, as needed. However, there is a problem that the operation becomes slow when advanced and complicated image processing is described in JavaScript.

When it is built to execute image processing in a server, as in Japanese Patent Laid-Open No. 2011-233034, the time is necessary to upload, to the server via Internet connection, data such as a photo present inside a mobile computer, and download the result after image processing. This is a serious problem to a user who requests stress-free instant processing of the mobile application. In addition, processing in the server cannot be executed offline.

As described above, the native application has an advantage that processing can be performed at high speed. However, the native application needs to be developed separately in different development languages for respective OSs, so the development cost and development time increase. Also, the native application needs to be compiled in advance. It is difficult to, for example, change the UI design of the application at the time of the operation or dynamically add a function. The native application is lack of flexibility.

An application will be examined, in which all or most part of the UI is described in a so-called Web standard language such as HTML5, CSS3, or JavaScript, and a function described in a native language can be used from content described in the Web standard language. By installing such an application in a mobile computer, a system which implements the advantages of both the Web application and native application can be built on the mobile computer.

A case where, for example, a photo print application operates on such a system will be considered. For example, this application draws a print target photo, superimposes date information such as a shooting date/time on the photo, superimposes a stamp image such as a pictorial symbol, and prints the superimposition result. Drawing of print content is described using the Web standard language. For example, when generating print content by the canvas of HTML5, a drawing area is first reserved by the canvas, and a photo and a stamp image are superimposed using a drawImage function. For example, when drawing the respective images of a photo, date, and stamp image on one canvas, content is overwritten by the drawImage function as follows:

```
<script>
var canvas=create a canvas
canvas.width=the lateral width of the canvas
canvas.height=the longitudinal width of the canvas
var ctx=obtain a context object for drawing content on the canvas
var img=PictureImage; //photo image
ctx.drawImage(img, ~); //designate the size and position of the image by subsequent arguments
img=DateImage; //date image
ctx.drawImage(img, ~); //superimpose the date image on the same canvas
img=StampImage; //stamp image
ctx.drawImage(img, ~); //superimpose the stamp image on the same canvas
</script>
```

To print the print content, it needs to be converted into image data (bitmap data) requested by the print engine of a printer. This processing is called rendering processing. In the rendering processing, bitmap data is obtained from the display area of the print content created on the UI of the application.

However, the resolution of bitmap data obtained from an image displayed on the UI is generally low, and the resolution of image data requested by the print engine is generally high. Hence, a jaggy or an image blur may be generated in enlargement processing from display image data to print image data. This image is not sharp and is not appropriate as a printed product.

SUMMARY OF THE INVENTION

An aspect of the present invention is to eliminate the above-mentioned problems with the conventional technology. The present invention provides an information processing apparatus and information processing method for preventing degradation of the image quality in printing a display image, and a storage medium storing a program.

The present invention in one aspect provides an information processing apparatus comprising: a processor; a storage unit configured to store a program having a layered structure including a first layer constituted by a script instruction set which is translated to be able to execute the script instruction set by the processor when executing an application and is executed by the processor, and a second layer constituted by an instruction set which is translated in advance to be able to execute the instruction set by the processor, the program executing the application by cooperation between the first layer and the second layer; a determination unit configured to, when printing an image displayed by a function of the application, determine rendering information for rendering an object, based on drawing information including a drawing position and size of the object of the image in the first layer; and a rendering unit configured to render the object in accordance with the rendering information determined by the determination unit in the second layer.

The present invention can prevent degradation of the image quality in printing a display image.

Further features of the present invention will become apparent from the following description of exemplary embodiments with reference to the attached drawings.

DESCRIPTION OF THE EMBODIMENTS

Figure 1:
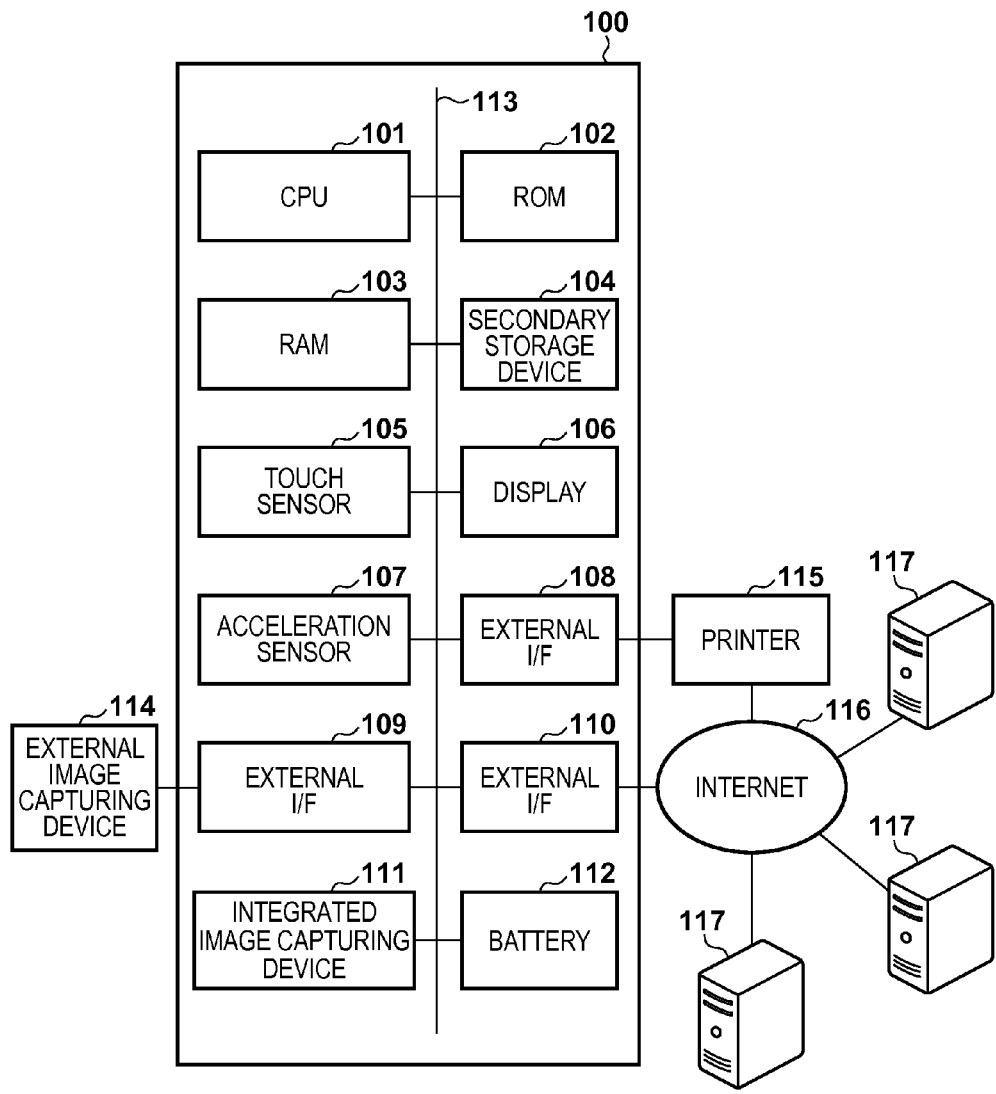
FIG. 1 is a block diagram showing the hardware arrangement of a portable information terminal.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a repetitive description thereof will be omitted.

[First Embodiment]

An operation when a photo print application as one Web application operates on a portable information terminal will be explained. The photo print application applies various kinds of image processing (for example, the luminance is corrected and a stamp image is added) to an image selected by the user, and then prints the print target content. Note that the photo print application is provided as a hybrid application to be described later in this embodiment.

[Hardware Arrangement]

FIG. 1 is a block diagram showing an example of the hardware arrangement of an information processing apparatus, particularly, a portable information terminal 100. Referring to FIG. 1, a CPU (Central Processing Unit) 101 reads out a program from a ROM 102 to a RAM 103 and executes it, thereby implementing an operation to be described in each embodiment. The ROM 102 is a computer-readable storage medium that stores a program to be executed by the CPU 101, and the like. The RAM 103 is used as a working memory for temporarily storing various data at the time of, for example, executing a program by the CPU 101. A secondary storage device 104 is, for example, a hard disk or a flash memory, and stores, for example, image files, image data, and a database that holds the processing results of image analysis and the like. A touch sensor 105 is a sensor for detecting a touch operation on a touch panel by the user. A display 106 displays a user interface screen such as a print setting screen on the photo print application, an image processing result, and the like. The display 106 may include the touch sensor 105.

An acceleration sensor 107 is a sensor for detecting an acceleration, and detects the tilt of the portable information terminal 100 or the like. An external interface (I/F) 108 connects the portable information terminal 100 to a printer 115. The portable information terminal 100 can use the external I/F 108 to print by the printer 115. The portable information terminal 100 can also use an external I/F 110 to print by the printer 115 via Internet 116. An external I/F 109 connects the portable information terminal 100 to an external image capturing device (camera) 114. Image data captured by the external image capturing device 114 or an integrated image capturing device 111 is stored in the secondary storage device 104 after predetermined image processing. The external I/F 110 includes a wireless LAN and connects the portable information terminal 100 to the Internet 116. The portable information terminal 100 can use the external I/F 110 to obtain image data and the like from various external servers 117 via the Internet 116. A battery 112 supplies power necessary for the operation of the portable information terminal 100. The units ranging from the CPU 101 to the battery 112 are connected to each other via a system bus (control bus/data bus) 113, and the CPU 101 performs overall control of the respective units.

The portable information terminal may include an external I/F for performing wired connection, such as a USB or a wired LAN. The portable information terminal may include an external I/F for performing wireless connection, such as Bluetooth® or infrared communication, in addition to the wireless LAN. As a connection form by the wireless LAN, for example, devices may be directly connected to each other, or a device may be connected to a communication destination device via a wireless LAN router (not shown).

[Software Arrangement]

Figure 2:
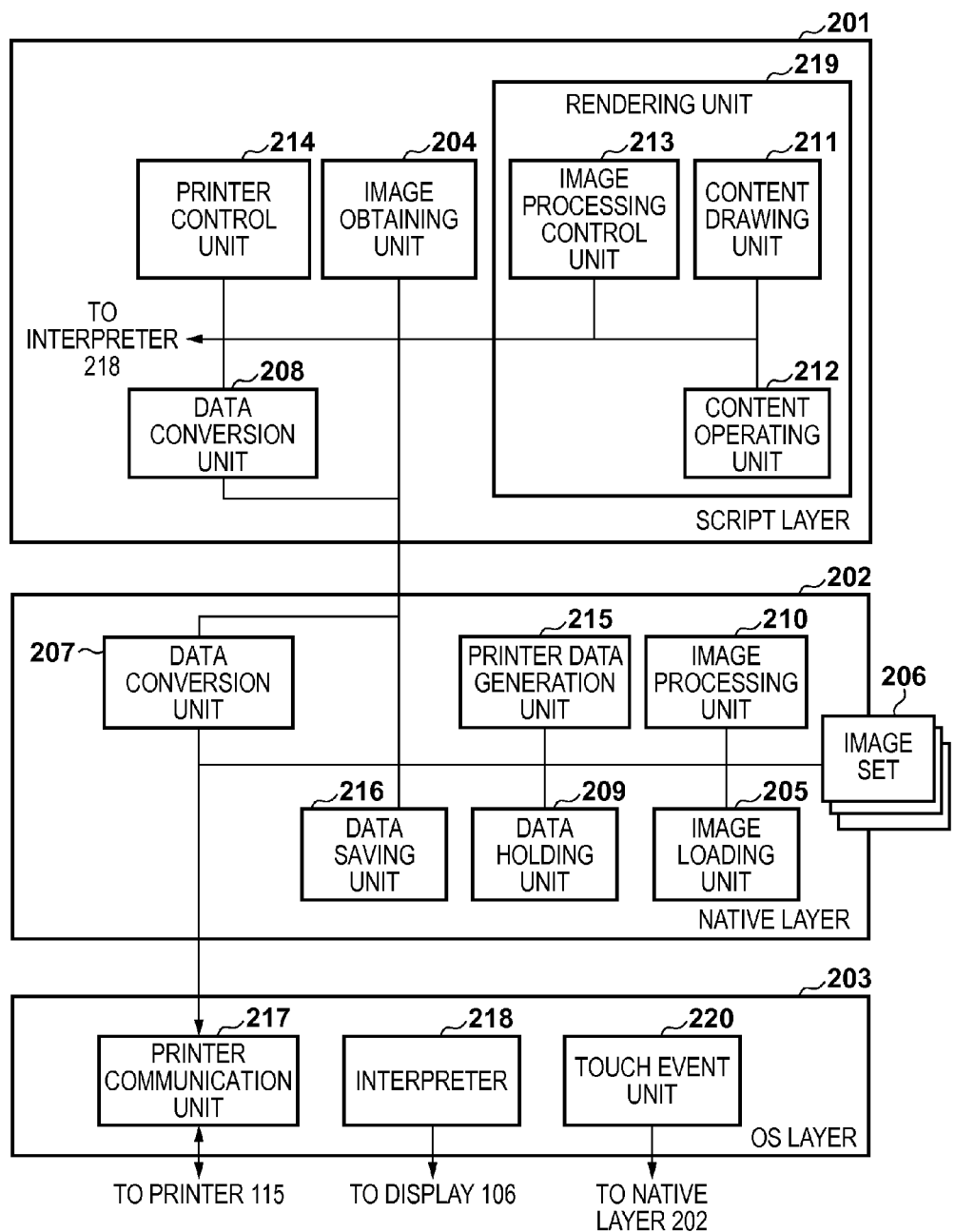
FIG. 2 is a block diagram showing the software arrangement of the portable information terminal.

FIG. 2 is a block diagram showing an example of a software arrangement on the portable information terminal 100 in order to execute the photo print application (to be referred to as the application hereinafter). The CPU 101 implements each block of the software shown in FIG. 2. In this embodiment, the software of the portable information terminal 100 has a three-layered structure of a script layer 201, native layer 202, and OS layer 203. The function of the application is implemented by the cooperation between the respective layers shown in FIG. 2. The script layer 201 describes various instructions (script instruction set) by text data in a Web standard language such as HTML5, CSS (Cascading Style Sheets) 3, or JavaScript. These instructions are instructions such as those for drawing of content, display of an image, and replay of a moving image. The script layer 201 holds text data of these instructions. The described script is executed by translating a text instruction set by a processor (the CPU 101) present in an application execution environment. The translation is executed in, for example, a form in which instruction sentences are dynamically translated line by line in every execution, a form in which instruction sentences are translated when the application is activated, or a form in which instruction sentences are translated when the application is installed in the portable information terminal 100. Processing in the script layer 201 and content in the script layer 201 will also be simply referred to as a script hereinafter. When the instructions of the script are translated in the device (the portable information terminal 100), the interpreter function of the native layer 202 or OS layer 203 to be described later is used. Note that a large portion of the UI of the application is described by the script in this embodiment.

The native layer 202 is a part which executes a processing instruction set translated (compiled) in advance in an environment other than the application execution environment. In the native layer 202, codes described in a high-level language such as C/C++ are compiled in advance on the server or the PC of the application developer into an ensemble of instructions directly interpretable by the CPU 101. Processing in the native layer 202 and content in the native layer 202, and invocation of the function of the OS layer 203 from the native layer 202 will also be simply referred to as a native hereinafter. Note that another implementation of the native layer 202 is Java. Java is a high-level language similar to C/C++, and is translated in advance into an intermediate code in the development environment at the time of application development. The translated intermediate code operates in the Java virtual environment of each OS. In this embodiment, this form is also one form of the native layer 202.

The OS layer 203 corresponds to the operating system (OS) of the device. The OS layer 203 has an OS-specific function and a role of providing the use of a hardware function to the application. The OS layer 203 includes an API, and the function of the OS layer 203 can be used from the script layer 201 and native layer 202.

In this embodiment, allowing invocation of the function of the native from the script layer 201 will be referred to as binding (or bind). Various native functions include an API, and the script layer 201 can use the native functions by invoking the API. Various OSs incorporate this binding function normally. In this embodiment, an application including both the script layer 201 and native layer 202 will be especially called a hybrid application. In the hybrid application, all or most part of the UI is described in a so-called Web standard language such as HTML5, CSS3, or JavaScript, and a function described in a native language can be used from content described in the Web standard language. By installing the hybrid application in the portable information terminal 100, a system which implements the advantages of both the Web application and native application can be built on the portable information terminal 100.

Each block in FIG. 2 will be explained below.

Obtainment of Image Data

An image obtaining unit 204 of the script layer 201 requests the native layer 202 to obtain image data. There are a plurality of obtainment request methods, including, for example, an absolute path designation method of designating the existence location of a file itself, and a method of prompting display of a dialog. Based on the obtainment request from the image obtaining unit 204, an image loading unit 205 of the native layer 202 obtains image data from an image set 206 of the native layer 202 serving as an area where image data are held. The method of obtaining image data from the image set 206 changes depending on the request method of the image obtaining unit 204. For example, the image loading unit 205 directly obtains image data based on the absolute path of a file, or obtains image data based on selection on a dialog display.

A data conversion unit 207 of the native layer 202 converts data in the native layer 202 into a data format usable in the script layer 201. In contrast, the data conversion unit 207 converts data sent from the script layer 201 into a data format usable in the native layer 202. A data conversion unit 208 of the script layer 201 converts data in the script layer 201 into a data format usable in the native layer 202. To the contrary, the data conversion unit 208 converts data sent from the native layer 202 into a data format usable in the script layer 201. In this embodiment, for example, image data obtained by the image loading unit 205 of the native layer 202 is converted into the base64 data format usable in the script layer 201, and the converted data is transferred to the script layer 201.

Loading/Saving of Image Data

A data holding unit 209 of the native layer 202 holds image data loaded by the image loading unit 205 and image data having undergone image processing by an image processing unit 210. The held image data is rasterized into RGB image data. Image processing can therefore be immediately executed on the image data which has been loaded by the image loading unit 205 and held. A data saving unit 216 of the native layer 202 stores, in the image set 206, image data held in the data holding unit 209, as needed.

Output

A rendering unit 219 of the script layer 201 is a block for creating a script about rendering of an output (display/print) target image. The rendering unit 219 includes a content drawing unit 211, a content operating unit 212, and an image processing control unit 213. In this embodiment, the display 106 does not display an image during script creation by the rendering unit 219. The content drawing unit 211 describes print target content in a Web standard language. The content operating unit 212 of the script layer 201 reflects an operation to an image in the script. Examples of the operation to an image are enlargement, movement, and rotation of an image. The description by the content drawing unit 211 also reflects content operated by the content operating unit 212. The script of the described content is interpreted by an interpreter 218 of the OS layer 203 to be described later, and displayed on the display 106. The image processing control unit 213 decides (determines) a correction parameter (for example, a luminance correction value) used in image processing, and a correction target image. If necessary, the data conversion unit 208 of the script layer 201 converts these data into a data format usable in the native layer 202, and transfers the converted data to the native layer 202.

The image processing unit 210 of the native layer 202 executes image processing (for example, luminance correction) on image data designated by the image processing control unit 213 of the script layer 201. At this time, image processing to be executed is decided in accordance with a correction parameter set by the image processing control unit 213. As for designation of image data, for example, there is a method of receiving the path of image data from the script layer 201.

A touch event unit 220 of the OS layer 203 obtains information about a touch on the display 106 by the user. The information about a touch includes, for example, detection of a touch on the display, and touched position information. The obtained data is transmitted to the content operating unit 212 of the script layer 201 via the native layer 202. For example, information about selection of a desired stamp image on the display 106 by the user is transmitted by the touch event unit 220 to the content operating unit 212 of the script layer 201 via the native layer 202.

The interpreter 218 of the OS layer 203 is a block which interprets/executes a script instruction generated in the script layer 201 and described in the Web standard language. An image drawing instruction or the like is interpreted by the interpreter 218, and display on the display 106 is executed. The interpreter 218 translates print content drawn in the script layer 201, renders the image data at a print resolution, and outputs the image data as RGB pixel values. The interpreter 218 is constituted in the OS layer 203 in FIG. 2, but may be constituted in the native layer 202.

Communication with Printer

A printer control unit 214 of the script layer 201 controls a rendering start request, a printer detection request, display of a printer setting screen, and generation and transmission of print information. Here, rendering is creation of bitmap data necessary for printing. In the printer setting screen, settings such as a paper size, paper type, and color/monochrome printing are possible. A printer data generation unit 215 of the native layer 202 generates print information based on the items set in the printer setting screen.

Based on the request from the printer control unit 214 of the script layer 201, the printer data generation unit 215 of the native layer 202 generates a command and data necessary for printer communication. The data necessary for printer communication is data complying with a communication protocol, and the command is data for deciding the operation of the printer such as printing or scanning. A printer communication unit 217 of the OS layer 203 is an interface for transmitting data received from the printer data generation unit 215 to the connected printer 115.

[Overall Sequence]

Figure 3:
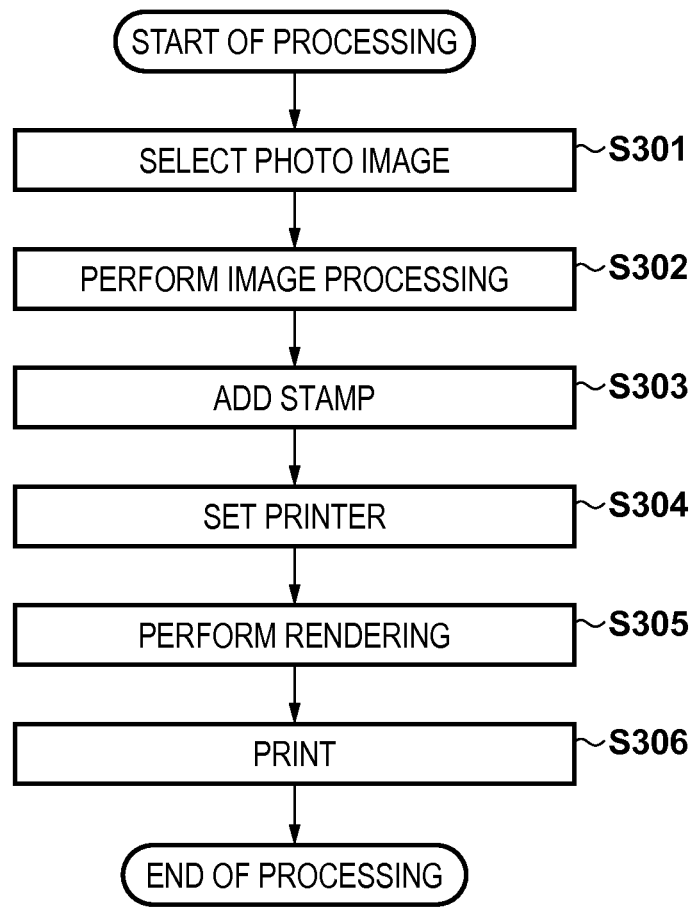
FIG. 3 is a flowchart showing the procedures of overall photo print processing.
Figure 10:
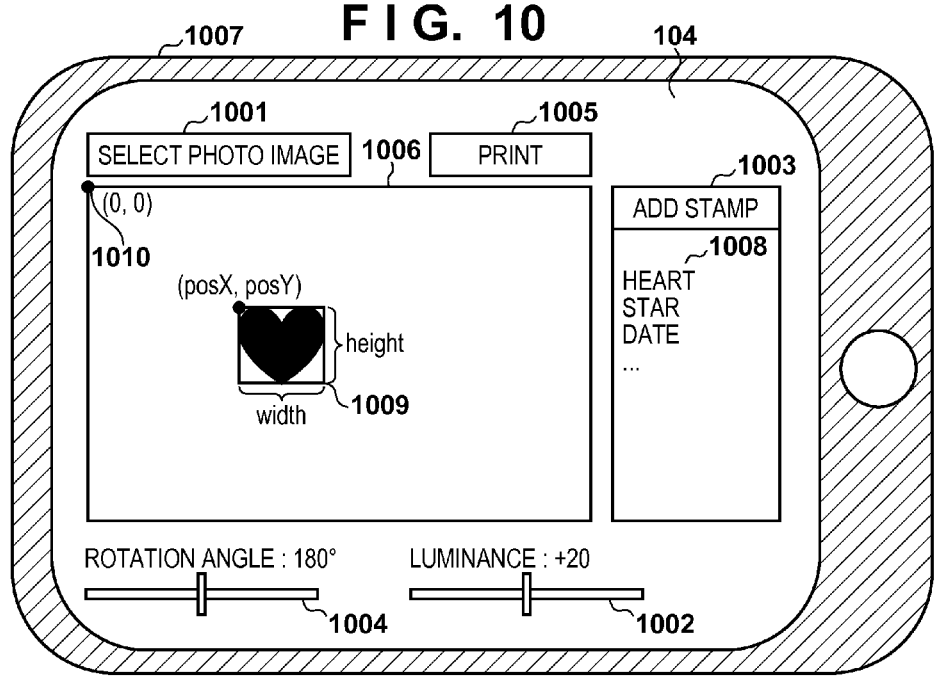
FIG. 10 is a view showing an example of a photo print application screen.

FIG. 3 is a flowchart showing the procedures of overall photo print processing according to this embodiment. The processing in FIG. 3 is implemented by, for example, reading out a program from the ROM 102 to the RAM 103 and executing it by the CPU 101. FIG. 10 is a view showing an example of a photo print application screen described by a script according to this embodiment.

In step S301, the CPU 101 detects pressing (including even a touch operation: this also applies to the following description) of a photo image selection button 1001 by the user, and accepts selection of an image. Upon accepting the selection of the image, the CPU 101 displays the selected image in an entire drawing area 1006.

In step S302, the CPU 101 detects a correction parameter (for example, a luminance correction value) which has been set by the user using a slide bar 1002 and is used at the time of image processing. The CPU 101 executes image processing on the image in accordance with the detected correction parameter, and displays the image in the entire drawing area 1006.

In step S303, if the CPU 101 detects pressing of a stamp addition button 1003 by the user, it displays a list of stamp images. The CPU 101 accepts selection of a desired stamp image by the user, and adds and displays the stamp image in the drawing area 1006.

Figure 11:
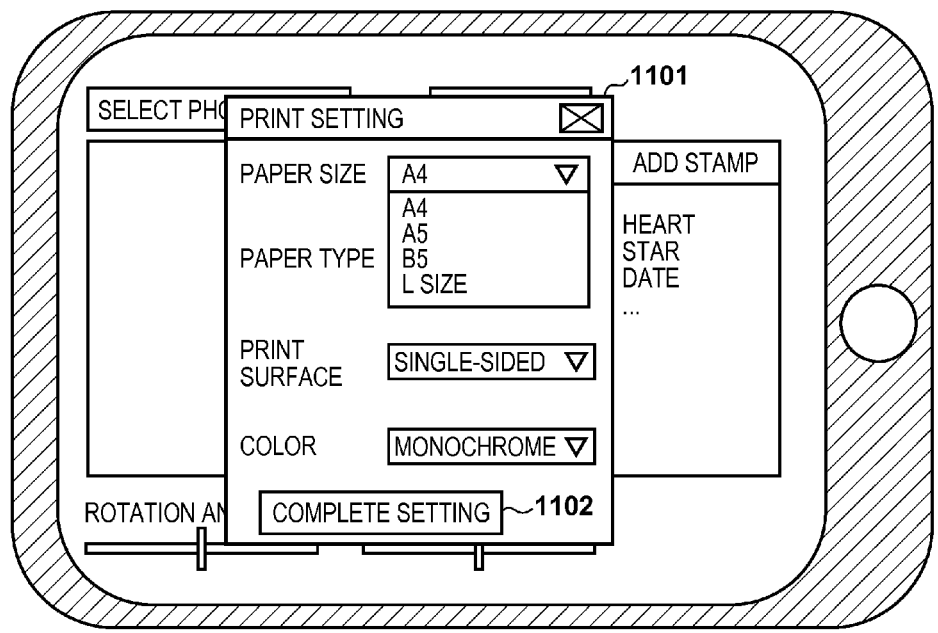
FIG. 11 is a view showing an example of the setting UI of a printer.

In step S304, if the CPU 101 detects pressing of a print button 1005, it displays a setting UI of information necessary for printing on the display 106. The information necessary for printing includes, for example, a paper size, double-sided, and monochrome/color printing. FIG. 11 shows an example of the setting UI of the printer.

In step S305, if the CPU 101 detects pressing of a setting completion button 1102 by the user, it starts rendering to create bitmap data necessary for printing. The CPU 101 creates image data at a print resolution for the image displayed in the drawing area 1006.

In step S306, the CPU 101 transmits the image data created at the print resolution in step S305 to the printer 115 together with a printer control command, and controls the printer 115 to output a printed product.

Although a minimum sequence has been described above for descriptive convenience, the present invention is not limited to the above-described processing sequence. A detailed operation in each step will be explained below.

[Photo Image Selection]

Figure 4:
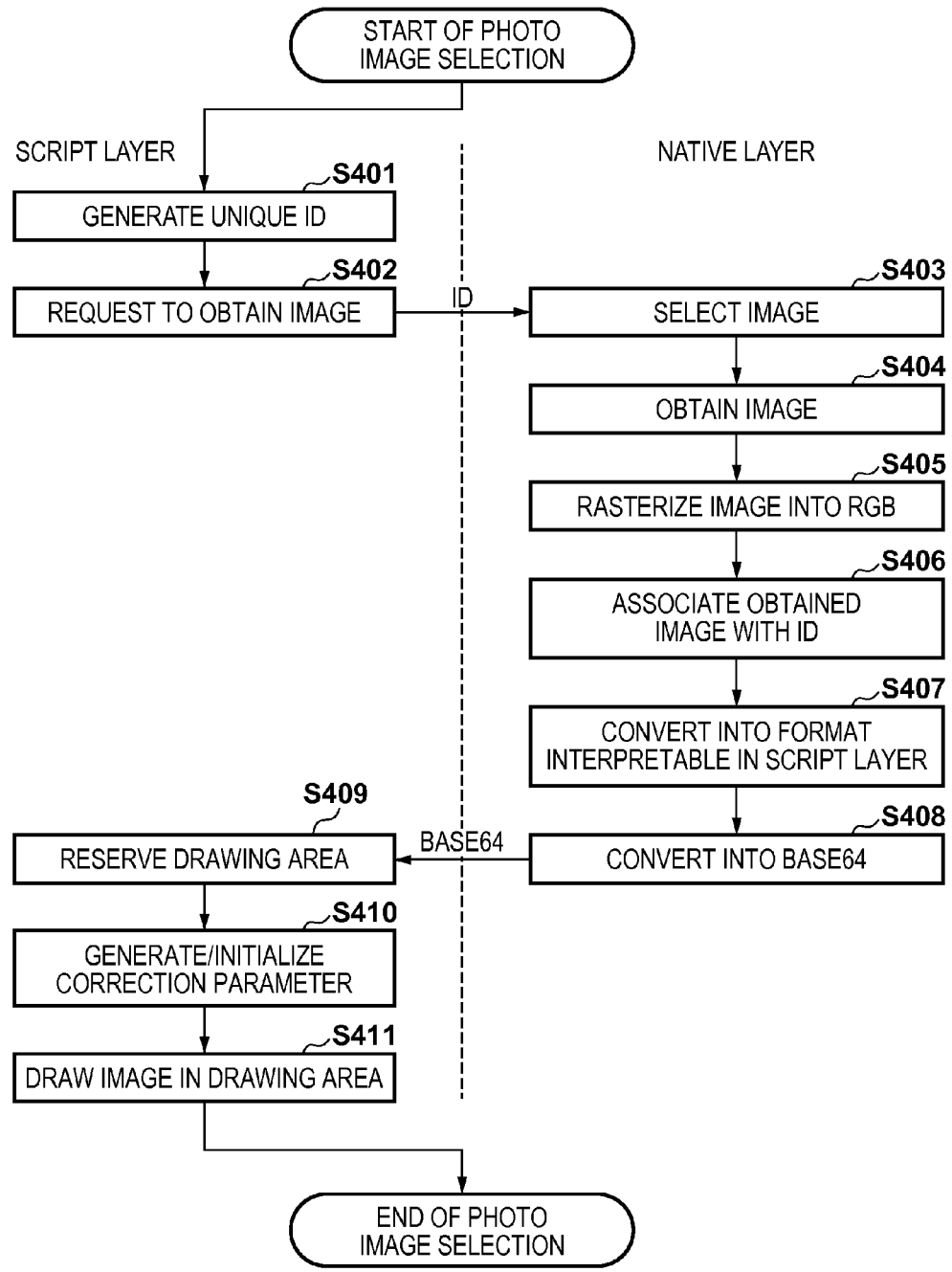
FIG. 4 is a flowchart showing photo image selection processing in step S301.

As described above, when pressing of the photo image selection button 1001 by the user is detected, the processing in step S301 starts. FIG. 4 is a flowchart showing the photo image selection processing in step S301. Steps S401, S402, and S409 to S411 in FIG. 4 are processes to be executed by the script layer 201, and steps S403 to S408 are processes to be executed by the native layer 202. The same illustration applies to other flowcharts.

In step S401, the image obtaining unit 204 of the script layer 201 generates a unique ID for identifying image data to be obtained. The ID may take any form such as a numerical value or a character string as long as it can be transmitted from the script layer 201 to the native layer 202.

In step S402, the image obtaining unit 204 of the script layer 201 transfers the ID to the native layer 202, and requests image selection. As the request method, the script layer 201 may directly invoke an image selection API unique to the native layer 202. When the image selection API unique to the native layer 202 cannot be directly invoked, a wrapper may be prepared in the native layer 202. The wrapper is a method of preparing in advance in the native layer 202 a function which can be invoked from the script layer 201, and invoking the function unique to the native layer 202 within the native function. The image selection API has a mechanism of transferring an ID as, for example, an argument. With this arrangement, the script layer 201 can transfer the ID to the native layer 202.

In step S403, the native layer 202 performs display control to display a device-specific image selection UI on the display 106. The image loading unit 205 accepts selection of an image on the displayed image selection UI by the user. The selection of an image may be selection of an image in a removable storage medium or selection of image data captured using the camera function of the portable information terminal 100.

In step S404, the image loading unit 205 of the native layer 202 obtains image data corresponding to the selected image from the image set 206. The image data is obtained by, for example, downloading or copying an image file. The file is opened in accordance with a language used in the native layer 202.

In step S405, the data holding unit 209 of the native layer 202 rasterizes the obtained image data into RGB data. The image data is held as RGB data in this embodiment, but is not limited to this. For example, bitmap data may be held in, for example, a JPEG (Joint Photography Expert Group), PNG (Portable Network Graphics), or RGBA format. The RGBA format is a data format obtained by combining A representing transparency with R, G, and B (Red, Green, and Blue) of image data.

In step S406, the data holding unit 209 of the native layer 202 stores the rasterized RGB data in association with the ID received in step S403. As the association method, for example, an object having the ID and RGB data is created to make it possible to specify the RGB data by the ID. The association between the ID and the RGB data is not limited to pairing the ID and the RGB data. For example, a method of associating the ID and the path of the RGB data may be used. Alternatively, a method of associating the first address of RGB data, or associating a function of invoking RGB data may be used.

In step S407, image data convertible into a format supported by the script layer 201 is generated based on the RGB data obtained in step S405. In this embodiment, for example, image data in the JPEG format is generated. The conversion from RGB data into JPEG data uses an encoder included in the OS.

In step S408, the data conversion unit 207 of the native layer 202 converts the JPEG data into base64 data. This is because neither the RGB data array nor the JPEG binary data can be used intact in the script layer 201, and the data needs to be converted into a format usable in the script layer 201. This embodiment assumes that, when JavaScript® is used, image data handled in the script layer 201 has the base64 format. base64 is an encoding method for handling binary data as character string data.

In step S409, the data conversion unit 208 of the script layer 201 receives the base64 data converted in step S408 from the data conversion unit 207 of the native layer 202. Then, an area for displaying the base64 data is reserved in the RAM 103. In this embodiment, for example, the canvas function of the HTML is used to reserve the memory, and the API of the Context object of the canvas is used to draw an image.

In step S410, the image processing control unit 213 of the script layer 201 generates and initializes a correction parameter. The correction parameter is an object holding parameters that decide the contents of image processing in step S302. Image processing to be executed in the native layer 202 is decided in accordance with the correction parameter. For example, the following correction parameter is generated by JavaScript:

```
var CorrectionParam = function( ) {
    this.brightness = 10;
}
```

This correction parameter represents that a variable name "brightness" for brightness correction is stored in a CorrectionParam object and a value of 10 is stored in brightness. For descriptive convenience, the correction parameter is only for brightness correction. However, types of image processing can be added by adding parameters for other correction processes.

In step S411, the image processing control unit 213 of the script layer 201 designates base64 data received from the native layer 202 as data to be drawn in the drawing area 1006. The interpreter 218 of the OS layer 203 can therefore interpret the script to display the image in the drawing area 1006. An example of a code for reflecting the base64 data in the drawing area 1006 is:

var base64 Data=base64 data from native
var canvas=document.createElement("canvas"); //reserve the drawing area of an image
canvas.setAttribute("width", 100); //set the size of the drawing area
canvas.setAttribute("height", 100);
canvas.setAttribute("id", "ImageID"); //add an ID to the canvas
var context=canvas.getContext("2d"); //generate an object which is drawn in the drawing area and has an API
var img=new Image( ); //generate an Image object
img.src=base64Data; //set the URI of the image as the received base64 data
img.onload=function( ); {//start processing after the end of loading the image
context.drawImage(img, 0, 0, img.width, img.height, 0, 0, canvas.width, canvas.height); //draw the image in the drawing area using the method of a context object
document.getElementById("div").appendChild(canvas);}

This embodiment uses a layered structure of canvases. When an operation such as drawing, movement, or enlargement is specified, these canvases are sequentially added to the drawing area 1006 designated by div. Normally, each canvas is handled as one image, and when a stamp image or the like is added after drawing a photo image on the canvas, the photo image and the stamp image are combined into one image. To the contrary, since canvases are superimposed and displayed using the layered structure in this embodiment, they are displayed as one image to the user, but actual drawing products are independent of each other. An example is a form in which a plurality of canvas objects exist in the div area, as in HTML DOM (Document Object Model). This example is:

```
<div width = 100 height = 100>
<canvas id="ImageID" width=100 height=100
style="position:absolute;left:0px; top:0px;"></canvas>
<canvas id="Stamp" width=10 height=10
style="position:absolute;left:10px;
top:10px;"></canvas>
...
</div>
```

The first canvas having a longitudinal width of 100 and a lateral width of 100 is added to a div area having a longitudinal width of 100 and a lateral width of 100. That is, the canvas overlaps the entire display area, and the entire photo image is displayed. The second canvas having a longitudinal width of 10 and a lateral width of 10 is added to a coordinate point (10, 10) when the upper left vertex of the div area is set as a reference. The respective canvases are independent, and unique IDs are designated for the respective canvases. When performing an operation by the script or obtaining information of a specific canvas, a corresponding ID is used. For example, the longitudinal width of the second canvas can be obtained by the following operation:
var width=document.getElementById("Stamp").width;

[Image Processing]

Figure 5:
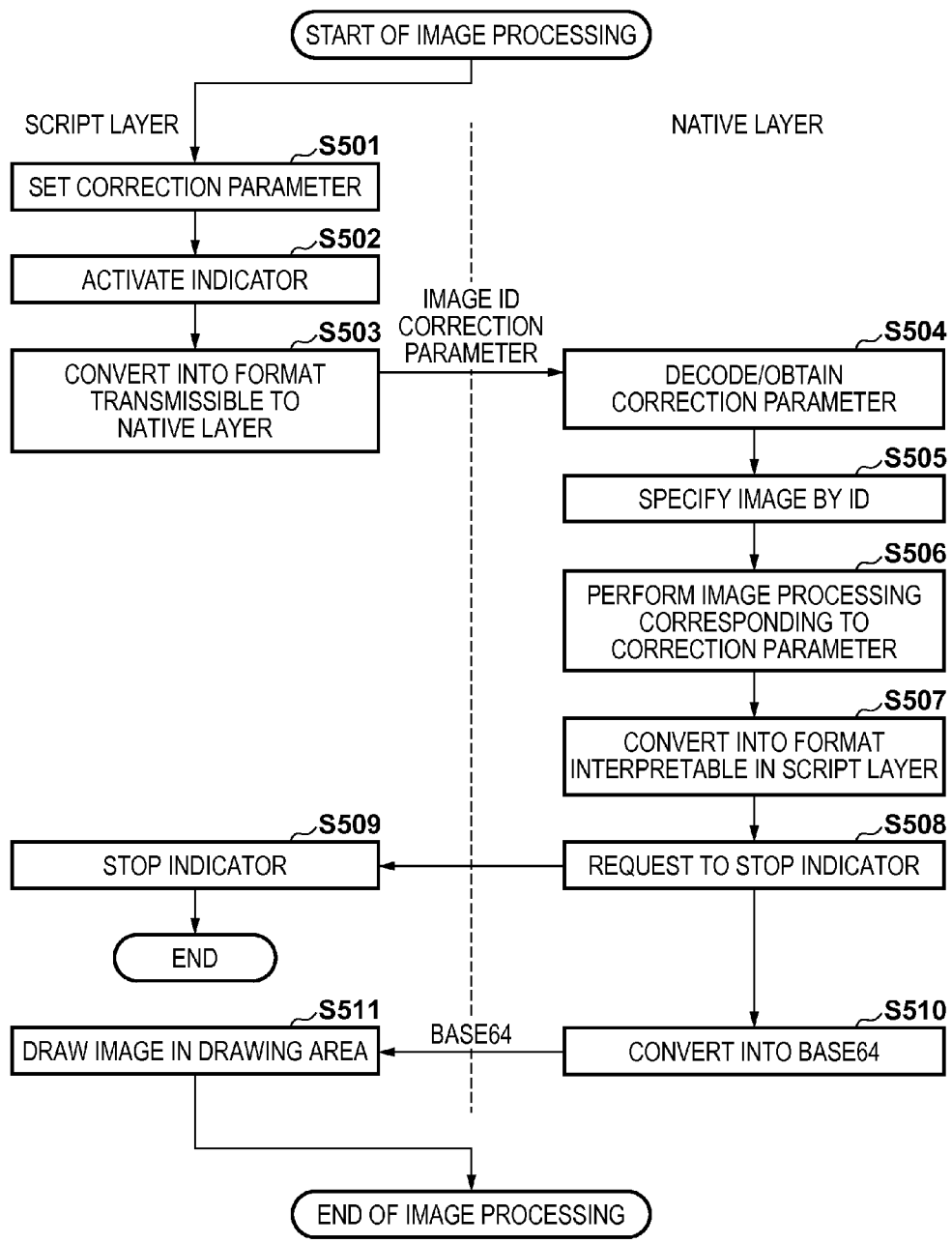
FIG. 5 is a flowchart showing image processing in step S302.

When setting of the slide bar 1002 by the user is detected, the processing in step S302 of FIG. 3 starts. FIG. 5 is a flowchart showing the image processing in step S302.

In step S501, the image processing control unit 213 of the script layer 201 updates the value (for example, brightness: this also applies to the following description) of the correction parameter generated in step S410 into a value set by the slide bar 1002.

In step S502, the image processing control unit 213 of the script layer 201 performs processing of activating an indicator, and displaying it on the display 106. The indicator is an icon which is displayed on the display 106 during data processing and represents a working state.

In step S503, the data conversion unit 208 of the script layer 201 converts the correction parameter into a JSON character string usable in the native. This is because the correction parameter has the object format, as described above, and cannot be interpreted by the native layer 202. The converted JSON character string is transferred to the native layer 202 together with the ID for identifying the image data generated in step S401.

In step S504, the image processing unit 210 of the native layer 202 parses (analyzes) the JSON data received as the character string. Parsing uses a parser included in the OS. The image processing unit 210 of the native layer 202 obtains the brightness value in the correction parameter by parsing.

In step S505, the image processing unit 210 of the native layer 202 specifies the image data (RGB data) rasterized into RGB data in step S405 based on the ID transmitted from the script layer 201. As described above, the association between the ID and the image data is not limited to pairing the ID and the image data, as described above. For example, the association may be performed by a method of associating the ID and the path of the image. Alternatively, the association may be performed by a method of associating the ID and the first address of the image data, or a method of associating the ID and a function of invoking image data.

In step S506, the image processing unit 210 of the native layer 202 decides image processing to be executed based on the obtained correction parameter, and performs the image processing corresponding to the correction parameter on the image data specified in step S505. This embodiment assumes that "10" is added to the RGB values of all pixels in accordance with the luminance correction parameter.

Types of image processing may be added by adding other kinds of information to the correction parameter. For example, image processes such as known monochrome conversion, known sepia conversion, ImageFix, RedeyeFix, and SmartSkin may be added. ImageFix is processing of automatically analyzing a photo image by using human face detection or scene analysis, and performing appropriate brightness or white balance adjustment. RedeyeFix is processing of automatically detecting a red eye image from an image and correcting it. SmartSkin is processing of detecting a human face from a photo image, and preferably processing the skin region of the face. Image processing may be executed by a function provided by the OS layer 203. It is also possible to display a plurality of image processes executable from the obtained correction parameter in a pull-down menu, and accept a user selection.

In step S507, image data convertible into a format supported by the script is generated based on image data having undergone the image processing in step S506. In this embodiment, for example, JPEG image data is generated.

In step S508, the image processing unit 210 of the native layer 202 requests the script layer 201 to stop the indicator. This is performed by invoking an indicator stop function defined in the script layer 201 from the native layer 202.

In step S509, the image processing control unit 213 of the script layer 201 stops the indicator, and stops display on the display. In step S510, the data conversion unit 207 of the native layer 202 converts the JPEG data into base64 data, and transmits the base64 data to the script layer 201.

In step S511, the data conversion unit 208 of the script layer 201 receives the base64 data converted in step S508 from the native layer 202. Then, the image processing control unit 213 of the script layer 201 designates the base64 data received from the native layer 202 as data to be drawn in the drawing area 1006. Accordingly, the interpreter 218 of the OS layer 203 interprets the script, and the image having undergone the image processing is displayed in the drawing area 1006.

Although this embodiment has described that image processing starts in response to a change of the slide bar 1002, the present invention is not limited to this form. Another example is a form in which plus and minus buttons are arranged on the screen and the brightness is adjusted every time the user presses the buttons. Still another example is a form in which image processing is synchronized with a touch event by the user such that the brightness is increased when right half of an image is touched or decreased when its left half is touched. A form is also possible, in which only the correction parameter is changed by a user operation, and all image processes are performed at once upon accepting an image processing execution instruction.

[Stamp Image Addition]

Figure 6:
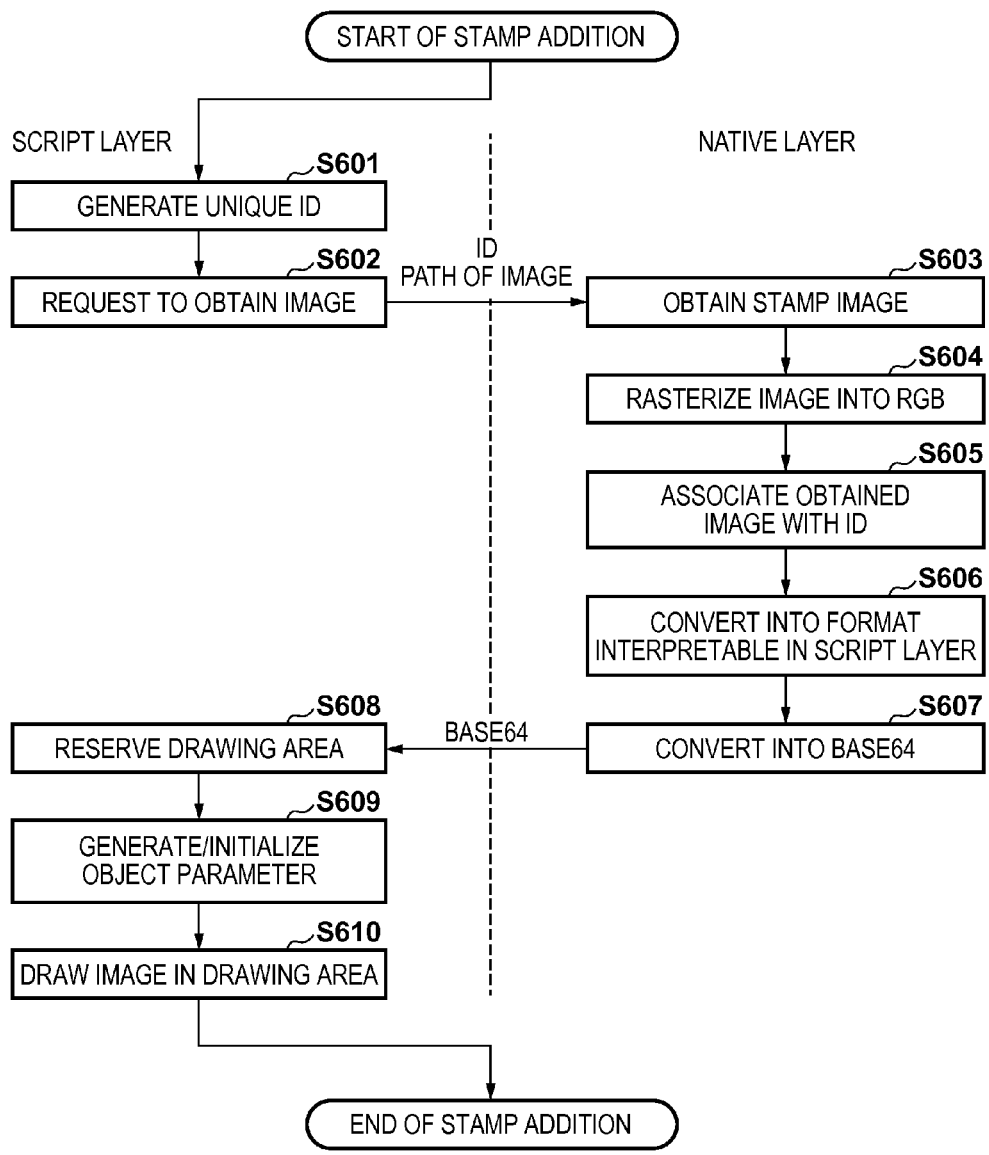
FIG. 6 is a flowchart showing stamp image addition processing in step S303.

When pressing of the stamp addition button 1003 by the user is detected and selection of a heart stamp image 1008 is detected, the processing in step S303 starts. FIG. 6 is a flowchart showing the stamp image addition processing in step S303.

In step S601, the image obtaining unit 204 of the script layer 201 generates a unique ID for identifying a stamp. This ID can take any form such as a numerical value or a character string as long as it can be transmitted from the script layer 201 to the native layer 202.

In step S602, the image obtaining unit 204 of the script layer 201 transmits the ID generated in step S601 and the absolute path of an image to be used as a stamp image to the native layer 202, and requests obtainment of the image.

In step S603, the image loading unit 205 of the native layer 202 obtains the image data by a device-specific API based on the absolute path of the image received from the script layer 201.

In step S604, the data holding unit 209 of the native layer 202 rasterizes the obtained image data into RGB image data and holds it.

In step S605, the data holding unit 209 of the native layer 202 stores the rasterized RGB image data and the ID received in step S602 in association with each other, as in step S406.

In step S606, image data convertible into a format supported by the script is generated based on the RGB data obtained in step S604. In this embodiment, for example, JPEG image data is generated. The conversion from RGB data into JPEG data uses an encoder included in the OS.

In step S607, the data conversion unit 207 of the native layer 202 converts the JPEG data into base64 data, and transmits the base64 data to the script layer 201.

In step S608, the data conversion unit 208 of the script layer 201 receives the base64 data converted in step S607 from the native layer 202. An area for displaying the base64 data is reserved in the RAM 103. For example, the HTML canvas function is used to reserve the memory.

In step S609, the image processing control unit 213 of the script layer 201 generates and initializes an object parameter. The object parameter is an object for holding parameters to be used at the time of drawing. For example, the following object parameter is generated by JavaScript:

```
var ObjectParam = function( ) {
    this.posX = 10;
    this.posY = 10;
    this.width = 100;
    this.height= 100;
    this.ImageData = BASE64Data;
}
```

This object parameter represents that a variable name "posX" indicating an x-coordinate from a reference point is included in an ObjectParam object, and a value of 10 is stored in posX. This reference point is an upper left coordinate point 1010 of the drawing area 1006. Similarly, posY represents a y-coordinate when the upper left corner of the drawing area 1006 is set as the reference point, width represents the lateral width of a drawing area 1009 of a stamp image, and height represents the longitudinal width of the drawing area 1009. BASE64Data represents image data received from the native layer 202.

That is, the object parameter corresponds to a drawing product object in this embodiment. In this embodiment, the size, position, and image data of a drawing product are used as the object parameter for descriptive convenience. However, other parameters (for example, rotation angle, translation amount, enlargement magnification) may be added and used at the time of drawing, rendering, or an object operation. Even the information holding method for the drawing object is not limited to this embodiment.

In step S610, the image processing control unit 213 of the script layer 201 designates the base64 data received from the native layer 202 as data to be drawn in the drawing area 1006. The interpreter 218 of the OS layer 203 interprets the script, and the image can be displayed in the drawing area 1006 based on the object parameter initialized in step S609.

Although one stamp image is handled in this embodiment for descriptive convenience, a plurality of stamp images may be handled. In addition, image data prepared in advance is used as a stamp image in this embodiment. However, a method of generating a drawing product by the script using the Context object of a canvas may be used. In this case, in step S602, a drawing product generated using the Context object is transmitted to the native layer 202, and the data holding unit 209 holds the drawing product as RGB data.

[Printer Setting]

Figure 7:
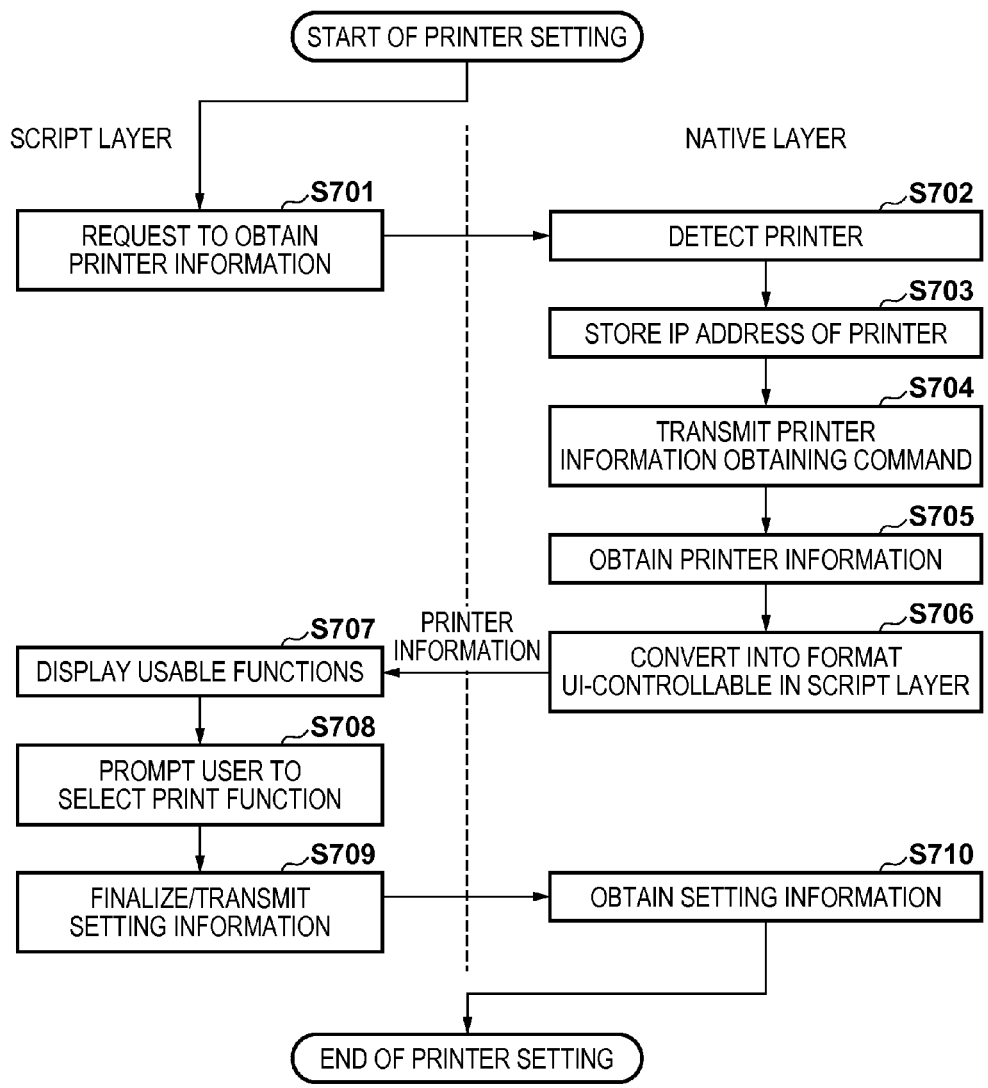
FIG. 7 is a flowchart showing printer setting processing in step S304.

When pressing of the print button 1005 by the user is detected, the processing in step S304 starts. FIG. 7 is a flowchart showing the printer setting processing in step S304.

In step S701, the printer control unit 214 of the script layer 201 requests the native layer 202 to obtain printer information. As the request method, for example, an API unique to the native layer 202 is invoked from the script layer 201 by using the binding function. In this case, a function which can be directly invoked from the script layer 201, or a so-called wrapper of indirectly invoking the function is prepared in advance in the native layer 202. For example, a GetPrinterInfo native function is prepared and invoked from the script layer 201.

In general, direct communication with an external device from the script layer 201 is impossible owing to the security restriction because, for example, it is difficult to guarantee confidential information. In this embodiment, the script layer 201 temporarily requests communication of the native layer 202, and then communicates with the external device via the native layer 202.

In step S702, if a corresponding function is invoked, the printer data generation unit 215 of the native layer 202 performs detection, that is, so-called discovery of the printer 115. To detect the communicable printer 115, a protocol such as Bonjour is used. The detection of the printer 115 is performed in, for example, a printer connected by the same wireless LAN router.

In step S703, the printer data generation unit 215 of the native layer 202 stores the IP address of the printer 115 that has responded by a method such as broadcasting or multicasting.

In step S704, the printer data generation unit 215 of the native layer 202 generates a command for requesting the IP address of the printer 115 that has responded in step S703, to provide printer information. If a plurality of printers have responded, the printer data generation unit 215 requests all the printers to provide information. The command is an instruction to designate the operation of the printer, and is expressed in, for example, XML (eXtensible Markup Language):

```
01:    <?xml version="1.0" encoding="utf-8" ?>
02:    <cmd xmlns:trans="http://www.xxxx/yyyyy/">
03:         <contents>
04:             <operation>GetPrinterInfo</operation>
05:         </contents>
06:    </cmd>
```

A numerical value such as "01:" written on the left side of each line is a line number added for the descriptive purpose, and is not described in an original text in the XML format.

The first line indicates a header representing that the command is described in the XML format.

On the second line, cmd indicates the start of the command. A name space is designated by xmlns to designate the definition of interpretation of the command. Note that </cmd> on the sixth line indicates the end of the command.

The third line indicates a declaration of describing content thereafter, and the fifth line indicates the end of the content.

On the fourth line, an instruction to be requested is described. An actual instruction word exists between <operation> and </operation>. An instruction word "GetPrinterInfo" is an instruction to obtain information of the printer 115 serving as an external device. This instruction word describes, for example, content of requesting to provide printer information such as a paper type, a size, the presence/absence of a borderless print function, and the print quality supported by the printer 115.

Note that the command may be generated by loading a permanent text stored in advance in the ROM 102 or the like. Also, the command is not limited to the text format such as XML, and may be described in the binary format and communicated by a protocol complying with the format. The generated command is transmitted to the printer 115 via the printer communication unit 217 of the OS layer 203 in a format complying with a protocol supported by a transmission destination printer. The method of communication with the printer 115 is not limited to the above one. Connection using Wi-Fi Direct, Bluetooth, infrared communication, a telephone line, a wired LAN, or a USB is also usable.

Although a command is generated in the native layer 202 in the above description, it may be generated in the script layer 201. In this case, an instruction sentence in the XML format is created in the script layer 201 and transferred to the native layer 202. After that, the instruction sentence is transmitted to the IP address of the printer 115 in a format complying with a communication protocol in the above-described manner.

Upon receiving the command, the printer 115 transmits the printer information in the XML format complying with the communication protocol to the native layer 202. An example of the printer information is given by:

```
01:    <?xml version="1.0" encoding="utf-8" ?>
02:    <cmd xmlns:trans="http://www.xxxx/yyyyy/">
03:      <contents>
04:        <device id="Printer001" />
05:        <mode = 1>
06:          <media>GlossyPaper</media>
07:          <size>A4</size>
08:          <quality>1</quality>
09:          <border>no</border>
10:        </mode>
11:        <mode = 2>
           ...
           </mode>
           <mode = 3>
           ...
           </mode>
           ...
         </contents>
       </cmd>
```

The first line indicates a header representing that the information is described in the XML format.

On the second line, cmd indicates the start of the command. A name space is designated by xmlns to designate the definition of interpretation of the command. Note that </cmd> on the last line indicates the end of the command.

The third line indicates a declaration of describing content thereafter, and the content continues up to </contents>.

The fourth line indicates a device ID representing that the model name of the printer is "Printer001".

The fifth line and subsequent lines describe respective modes. Information of a corresponding mode is described between <mode> and </mode>. On the fifth line, the number of a mode is 1. After that, <media> describes the type of printing paper, <size> describes a paper size, <quality> describes the print quality, and <border> describes bordered/borderless information.

The 11th and subsequent lines describe information about mode 2 serving as another mode. In this way, the model name of a printer and all print modes supported by the printer are described in the XML format. Note that the method of describing printer information is not limited to this. The printer information may be described by a text, which is not a tag format, a binary format, or the like. Although information of the print function of the printer is transferred in the above example, the present invention is not limited to this. For example, information about image processing and analysis processing processable by the printer, the presence/absence of a silent print mode, the presence/absence of the use of a memory card, and a status such as the remaining ink amount may be transferred. Examples of image processing are color conversion (for example, monochrome conversion, sepia conversion, and chroma enhancement), multiple image layout, white balance correction, noise reduction, and processing of automatically correcting a photo to a preferable color and luminance.

In step S705, the printer data generation unit 215 of the native layer 202 receives the printer information from the printer 115 via the printer communication unit 217 of the OS layer 203. The printer data generation unit 215 obtains, from the received printer information, the items of the type and size of printing paper, print quality, and bordered/borderless in all the modes, and the number of items.

In step S706, the printer data generation unit 215 of the native layer 202 sends the printer information to the script layer 201 in a format interpretable by the script layer 201. For example, the printer data generation unit 215 of the native layer 202 sends the printer information in the XML format just as it has been received, or sends it after converting it into a tag-less text format. Every time a specific native function is invoked from the script layer 201, information may be transmitted as a return value. Alternatively, the argument of a mode to be obtained or the like may be given to the native function, and information may be transmitted as a return value. In addition, the information may be transferred using a JSON character string, or transferred by the data conversion units 207 and 208 using a character string such as base64.

In step S707, the script layer 201 forms a display screen based on the received printer information, and displays it on the display 106. If there are a plurality of connectable printers, the script layer 201 performs processing of displaying a plurality of printer names so that the user can select a printer. Note that selection of a printer is not limited to this. For example, the printer may be selected based on a printer which responds earliest, a printer having more functions, a printer with not so many print jobs, or the like.

In step S708, the script layer 201 performs processing of displaying, on the display 106, the print setting screen for prompting the user to select the type and size of printing paper, the print quality, bordered/borderless, and the like. An example of the method of forming a print setting screen is an HTML/JavaScript description:

```
<!DOCTYPE html>
<head>
<title>print setting </title>
<script>
        <!-- paper size -->
        var PaperSizeNum = GetPaperSizeNum( );
var p = document.getElementById("PaperList");
var i;
        for(i=0; i<PaperSizeNum; i++){
                p.options[i] = new Option(GetPaperSize(i),
GetPaperSize(i));
}
        <!-- paper type -->
var MediaTypeNum = GetMediaTypeNum( );
        var m = document.getElementById("MediaList");
        var j;
        for (j=0; j<MediaTypeNum; j++){
m.options[i] = new
Option(GetMediaType(j),GetMediaType(j));
}
        <!-- print quality -->
        var QualityNum = GetQualityNum();
var q = document.getElementById("QualityList");
var k
        for (k=0; k< QualityNum; k++){
                q.options[i] = new Option(GetQuality(k),
GetQuality(k));
}
        <!-- bordered/borderless -->
        var BorderNum = GetBorderNum();
var b = document.getElementById("BorderList");
varl;
        for (l=0; l<BorderNum;l++){
b.options[i] = new Option (GetBorder(l),GetBorder(l));
}
        <!-- print funtion -->
        function printer() {
        SetPrint(document.getElementById("PaperList").value
document.getElementById("MediaList ").value),
document.getElementById("QualityList ").value),
document.getElementById("BorderList ").value);
        }
</script>
</head>
<!-- display unit -->
<body>
paper size:    <select id="PaperList"></select><br />
paper type:    <select id="MediaList"></select><br />
print quality: <select id="QualityList"></select><br />
borderless:    <select id="BorderList"></select><br />
<br />
<button id="btn1" onclick="printer( )">print setting
completion</button>
</body>
</html>
```

In the above description, GetPaperSizeNum( ), GetMediaTypeNum( ), GetQualityNum( ), and GetBorderNum( ) are native functions, and each native function has a function of obtaining an item count. For example, when paper sizes supported by the printer are four types of A4, A5, B5, and L size, GetPaperSizeNum( ) returns 4.

Also, GetPaperSize(n), GetMediaType(n), GetQuality(n), and GetBorder(n) are native functions, and each function returns the nth character string corresponding to the argument n. For example, the return value of GetPaperSize(0) as a function of returning the paper size is "A4", and the return value of GetPaperSize(1) is "A5". These values are obtained by the native layer 202 from information sent from the printer 115 via the OS layer 203. The native layer 202 decides these words in association with the information sent from the printer 115. For example, if a value extracted from information sent from the printer 115 is "GlossyPaper", "glossy paper" is decided as a text to be displayed. As the decision method, the native layer 202 holds a correspondence table in advance and decides a text in accordance with the correspondence table.

In the above example, the paper size, paper type, print quality, and bordered/borderless settings are made. However, the present invention is not limited to this, and other settings such as double-sided/single-sided, color/monochrome, and ON/OFF of image correction may be made. Furthermore, not only the above-mentioned print function, but also information about image processing and analysis processing processable by the printer 115, the presence/absence of a silent print mode, the presence/absence of the use of a memory card, and a status such as the remaining ink amount may be displayed.

For example, a user interface such as a print setting screen 1101 shown in FIG. 11 is implemented using a Web rendering engine based on the obtained information as in the above example. That is, in this embodiment, the script layer 201 requests printer information of the external printer 115 via the native layer 202, and displays the print setting screen on the display 106 based on information obtained using the native function. Note that the HTML can be formed either in the script layer 201 or in the native layer 202. As shown in FIG. 11, the paper size and the like are provided by a pull-down menu, and a touch operation of selecting an item by the user can be accepted.

In step S709, upon detecting pressing of the setting completion button 1102, the printer control unit 214 of the script layer 201 transmits each print information selected by the user in step S708 to the native layer 202. In the above HTML example, SetPrint( ) invokes a native function by using the obtained printer setting information as an argument. In the above example, the paper size, paper type, print quality, and bordered/borderless settings are transferred as character strings to the native layer 202.

In step S710, the printer data generation unit 215 of the native layer 202 obtains the print information transmitted from the script layer 201. The printer data generation unit 215 generates a print command in accordance with the communication protocol of the printer based on the obtained print information, and transmits the print command to the printer 115 via the printer communication unit 217 of the OS layer 203.

[Rendering]

Figure 8:
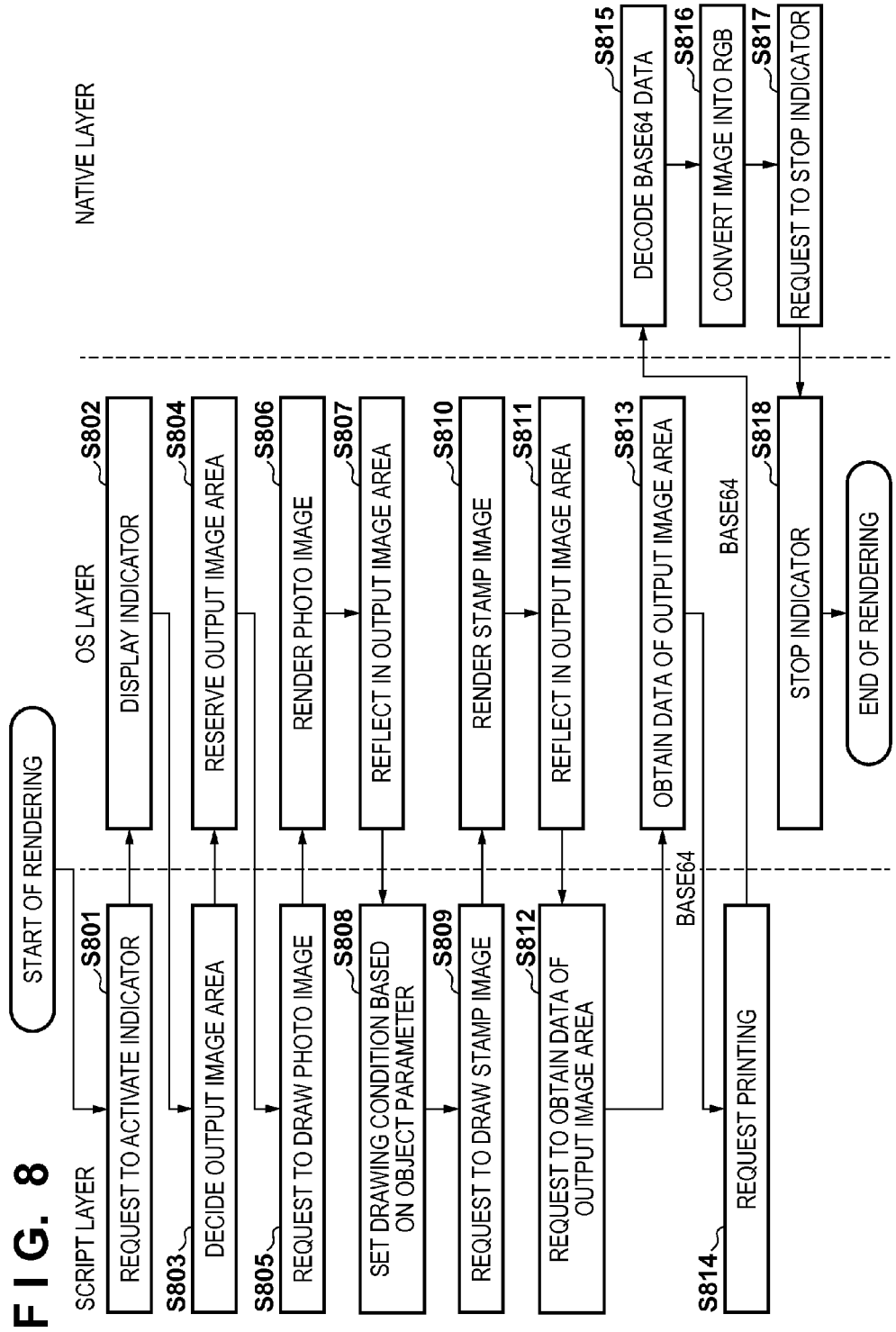
FIG. 8 is a flowchart showing rendering processing in step S305.

When pressing of the setting completion button 1102 of the setting screen 1101 by the user is detected, the processing in step S305 starts. FIG. 8 is a flowchart showing the rendering processing in step S305.

In step S801, the printer control unit 214 of the script layer 201 requests the OS layer 203 to activate an indicator. In step S802, the OS layer 203 displays the indicator on the display 106.

In step S803, the printer control unit 214 of the script layer 201 decides an output size corresponding to the paper size for printing based on the print information set in step S709, and transfers the output size to the OS layer 203.

In step S804, the OS layer 203 reserves an output image area corresponding to the received output size in the RAM 103. The output image area is one canvas area. The aforementioned canvases (for example, a photo image and a stamp image to be added) are combined with the canvas of this output size so that a display image on the display 106 and a print image relatively match each other in terms of the size and the position in the area.

In step S805, the printer control unit 214 of the script layer 201 requests the OS layer 203 to draw a photo image. At this time, the printer control unit 214 requests the OS layer 203 to draw the photo image in the entire output image area reserved in step S804. The drawing of the image is performed using the drawImage method of the Context object in the case of the canvas. The photo image data is represented by an object parameter ImageData.

In step S806, the interpreter 218 of the OS layer 203 interprets the drawing-requested script, and renders the photo image. In step S807, the OS layer 203 stores the image data after rendering in the output image area reserved in step S804. Here, "reflect in output image area" in step S807 of FIG. 8 is to add a change to the output image area (memory) reserved in step S804, as described above, and is not to display an image on the display 106.

In step S808, the image processing control unit 213 of the script layer 201 describes a change of the rendering condition based on the object parameter by the script for a stamp image. The change of the rendering condition is, for example, a change of the enlargement magnification or translation amount of the stamp image at the time of scaling the drawing area 1006 to a print area such as A4 size.

First, the script obtains the enlargement magnification of the stamp image. A lateral enlargement magnification scaleX and longitudinal enlargement magnification scaleY of the stamp image are respectively calculated from:

$$\text{scaleX} = \text{lateral size of output image/lateral size of drawing area 1006} \quad (1)$$

$$\text{scaleY} = \text{longitudinal size of output image/longitudinal size of drawing area 1006} \quad (2)$$

This is because a display image to the user and a print image differ in the relative size and drawing position of the stamp image unless the stamp image is enlarged when enlarging the drawing area 1006. Enlargement of the stamp image at the obtained enlargement magnification is performed using, for example, the scale method of the Context object in the case of the canvas.

Thereafter, the position of the stamp image after enlargement is obtained. Similar to the above-mentioned size, the position of the stamp image needs to be changed so that the relative position of the stamp image in the print image does not shift from the display image seen by the user on the display 106. The position of the stamp image after rearrangement is obtained by multiplying the current position by the enlargement magnification. An x-coordinate posX' and y-coordinate posY' after rearrangement are respectively calculated from:

$$\text{posX}' = \text{poxX} \times \text{scaleX} \quad (3)$$

$$\text{posY}' = \text{posY} \times \text{scaleY} \quad (4)$$

Content is translated to the position after rearrangement by using, for example, the translate method of the Context object in the case of the canvas.

In this embodiment, in step S808, the enlargement magnification and translation amount are calculated by the canvas function as described above, and rendering information (rendering condition) necessary for rendering in the OS layer 203 is set from drawing information for display.

In step S809, the image processing control unit 213 of the script layer 201 sends a request to the OS layer 203 to draw the stamp image, together with the rendering condition set in step S808.

In step S810, the OS layer 203 renders the stamp image in accordance with the rendering condition set in step S808. That is, in this embodiment, the OS layer 203 executes translation and resizing of the stamp image.

In step S811, the OS layer 203 stores the stamp image data after rendering in the output image area reserved in step S804. Here, "reflect in output image area" in step S811 of FIG. 8 is to add a change to the output image area (memory) reserved in step S804, as in step S807, and is not to display an image on the display 106.

In step S812, the image processing control unit 213 of the script layer 201 requests the native layer 202 to obtain image data for printing.

In step S813, the OS layer 203 converts the image data in the output image area into the base64 data format, and transmits the base64 data to the script layer 201.

In step S814, the printer control unit 214 of the script layer 201 transmits the base64 data to the native layer 202, and requests printing.

In step S815, the printer data generation unit 215 of the native layer 202 decodes the base64 data transmitted from the script layer 201. The printer data generation unit 215 of the native layer 202 converts the decoded data into RGB data in step S816, and requests the OS layer 203 to stop the indicator in step S817. In step S818, the OS layer 203 stops the indicator and stops the display on the display.

[Printing]

Figure 9:
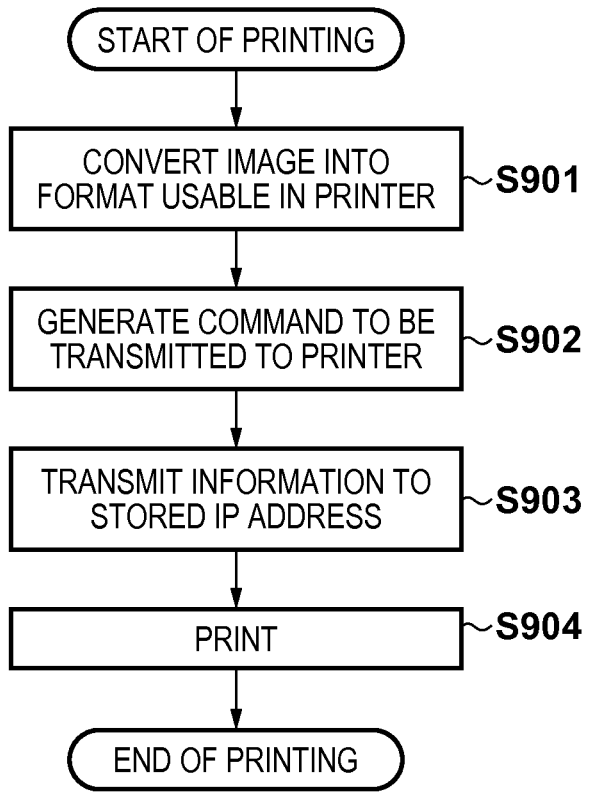
FIG. 9 is a flowchart showing print processing in step S306.

After the processing in step S818 ends, the processing in step S306 starts. FIG. 9 is a flowchart showing the print processing in step S306.

In step S901, the printer data generation unit 215 of the native layer 202 converts the RGB data converted in step S816 into a data format processable by the printer 115 based on the print information obtained in step S710. Data formats processable by the printer 115 vary from a standard format (for example, JPEG) to a vendor-specific format. Any of these data formats is available here.

In step S902, the printer data generation unit 215 of the native layer 202 generates a command to be transmitted to the printer 115 based on the print information and the RGB data generated in step S901.

In step S903, the printer data generation unit 215 of the native layer 202 transmits the command generated in step S902 via the printer communication unit 217 of the OS layer 203 in accordance with a communication protocol supportable by the printer 115. At this time, the transmission destination is the IP address stored in step S703.

In step S904, the printer 115 starts printing and outputs a printed product.

As described above, according to the first embodiment, at the time of printing, print data (data complying with the print resolution) is generated from information of original image data used for display, instead of generating the print data from a display image on the display 106. For example, when a stamp image is combined with a photo image in a display image, the OS layer 203 generates print data by combining the photo image data and the stamp image data from their pieces of information. That is, enlargement processing from the drawing area 1006 to a print image, and the like are performed separately for photo image data and stamp image data in the OS layer 203, and then the photo image data and the stamp image data are combined. When generating print image data from display image data, a blur of the image by resolution conversion or enlargement processing can be reduced, and rendering almost free from degradation of the image quality can be implemented.

[Second Embodiment]

The second embodiment will describe a method of operating an added stamp image by a script. A difference from the first embodiment will be explained.

[User Operation Sequence]

Figure 12:
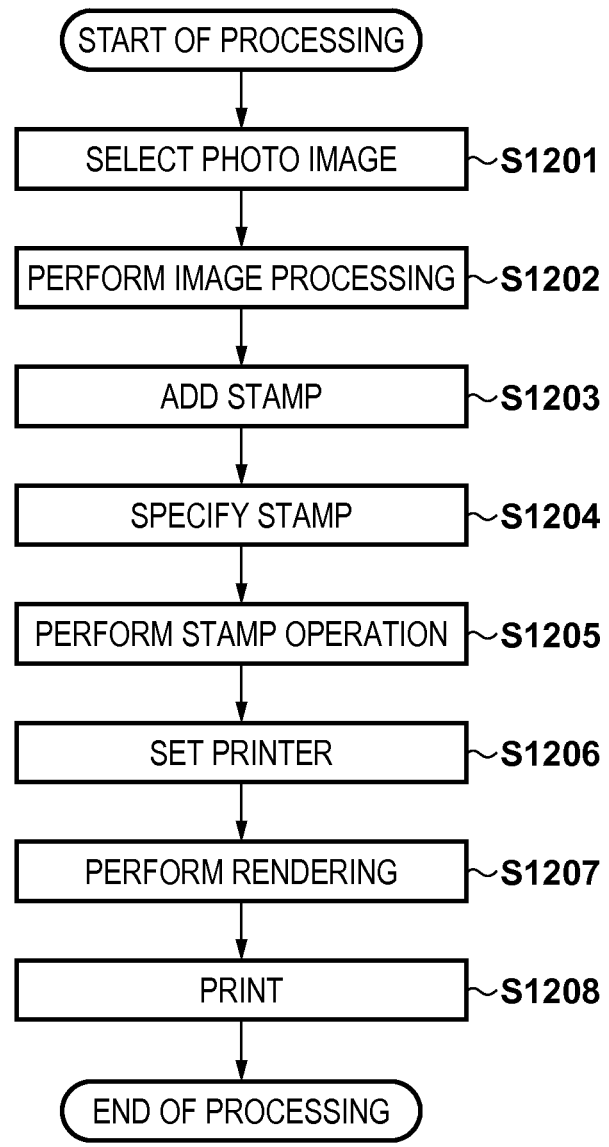
FIG. 12 is another flowchart showing the procedures of overall photo print processing.

FIG. 12 is a flowchart showing the procedures of overall photo print processing according to this embodiment. The processing in this embodiment is different from FIG. 3 in that specifying of a stamp image in step S1204 and an operation to the stamp image in step S1205 are performed after stamp image addition processing in step S1203. Steps S1201 to S1203 in FIG. 12 correspond to steps S301 to S303 in FIG. 3, and steps S1206 to S1208 in FIG. 12 correspond to steps S304 to S306 in FIG. 3.

[Specifying of Stamp Image]

Upon detecting a tap operation on a display 106 by the user after adding a stamp image in step S1203, the stamp image specifying processing in step S1204 starts. The tap operation is a touch operation of pressing the display 106 by the finger of the user. This is equivalent to "click" in a PC.

Figure 13:
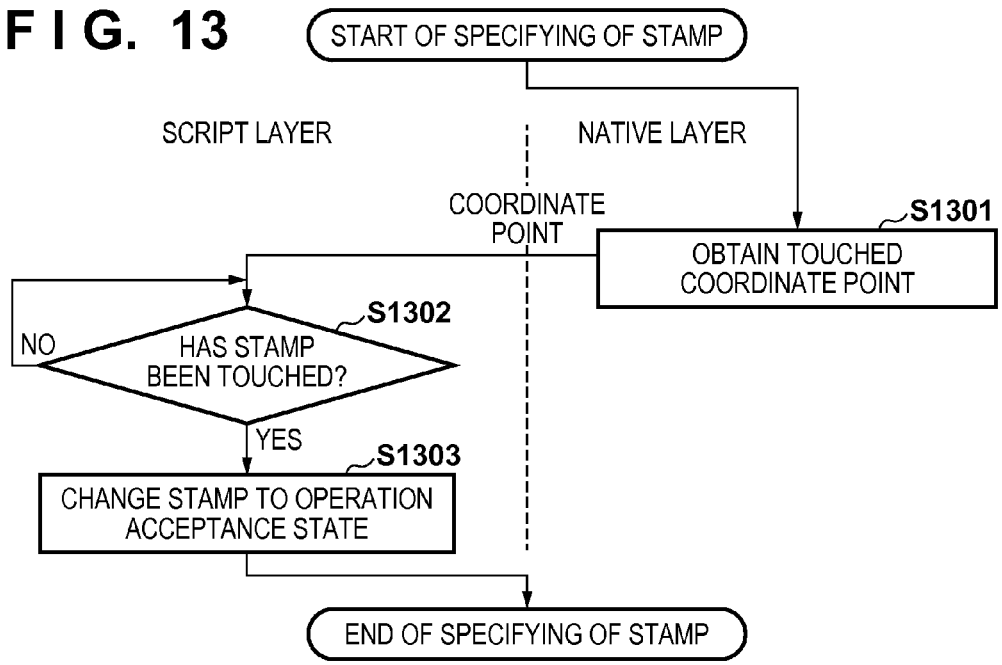
FIG. 13 is a flowchart showing stamp image specifying processing in step S1204.

FIG. 13 is a flowchart showing the stamp image specifying processing.

In step S1301, an image processing unit 210 of a native layer 202 obtains the coordinate point of the tap via a touch event unit 220 of an OS layer 203, and transmits it to a script layer 201.

In step S1302, a content operating unit 212 of the script layer 201 determines, from the coordinate point sent from the native layer 202 and information of an object parameter generated in step S609, whether a stamp image has been touched. Since the object parameter of the stamp image remains unchanged from its initial value, the stamp image is drawn in a square area having upper left vertex coordinates of (10, 10) and lower right vertex coordinates of (110, 110). That is, if x- and y-coordinates sent in step S1301 fall within the range of the square area, it is determined that the stamp image has been touched. For example, if a value obtained by subtracting the x-coordinate of a drawing area 1006 from the x-coordinate transmitted in step S1301 falls within the range of 0 to 100, and a value obtained by subtracting the y-coordinate of the drawing area 1006 from the transmitted y-coordinate falls within the range of 0 to 100, it is determined that the stamp image has been touched. If there are a plurality of stamp images, the determination is made sequentially from a stamp image displayed in an upper layer, and when a stamp image is specified, the determination processing ends. If it is determined that the stamp image has been touched, the stamp image changes to a state in which an operation to the stamp image is accepted.

In step S1303, the content operating unit 212 of the script layer 201 changes the stamp image to the operation acceptance state. The operation acceptance state is a state in which when an instruction about a stamp image operation (for example, swipe) is issued, the stamp image can be operated (can be swiped) in accordance with this instruction. When there is no stamp image in the operation acceptance state, nothing occurs even if an instruction about a stamp image operation is issued. The ID of the stamp image in the operation acceptance state is temporarily stored as the ID of a stamp image of interest in the script layer 201. Thus, the script layer 201 can uniquely specify the stamp image stored in the native layer 202.

[Stamp Image Operation]

Figure 14:
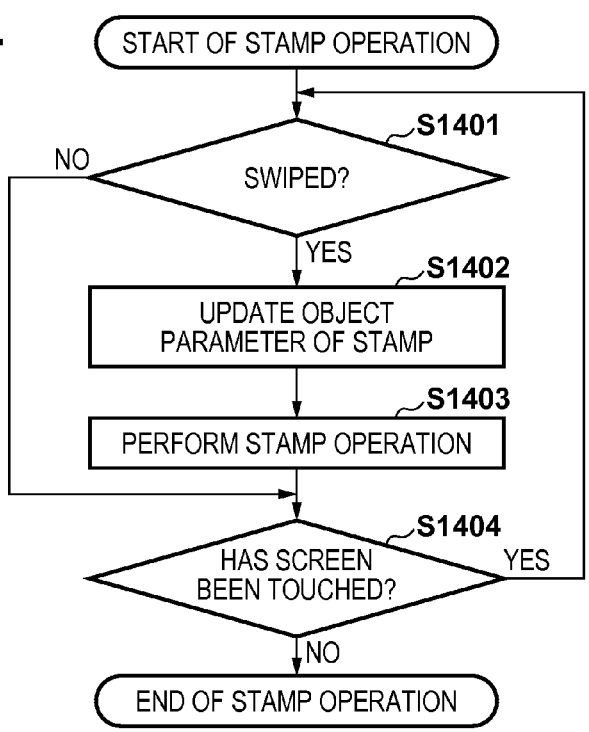
FIG. 14 is a flowchart showing stamp image operation processing in step S1205.

If the stamp image changes to the operation acceptance state in step S1302, the stamp image operation in step S1205 starts. FIG. 14 is a flowchart showing the stamp image operation processing in step S1205.

In step S1401, the content operating unit 212 of the script layer 201 determines, based on information obtained from the touch event unit 220 of the OS layer 203 via the native layer 202, whether the stamp image has been swiped. If the content operating unit 212 determines that the stamp image has been swiped, the process advances to step S1402. If the content operating unit 212 determines that the stamp image has not been swiped, the process advances to step S1404.

The swipe is an operation of tapping the display 106 by the user and then moving his finger without releasing his finger from the screen. This is equivalent to "drag" in a PC.

In step S1402, the content operating unit 212 of the script layer 201 updates the posX and posY values of the object parameter of the stamp image into x- and y-coordinates obtained from the touch event unit 220 via the native layer 202.

In step S1403, an image processing control unit 213 of the script layer 201 moves a stamp image 1009 in the drawing area 1006 to the coordinate position (posX, posY) by the DOM operation based on the updated posX and posY values. For example, when changing the coordinate position of the stamp from the obtained information, the following script is created:

```
update(x, y){    //update the coordinate position
//x: an x-coordinate from the reference point (1010 in
Fig. 10) of the drawing area
//y: a y-coordinate from the reference point of the
drawing area
    var stamp = a stamp in the operation acceptance
state (entity of Canvas serving as the stamp)
    var id = stamp.getAttribute("id");   //obtain the
id of the stamp
    var ObjectParam = ObjectParamArray[id];
//obtain the object parameter of the stamp in the
operation acceptance state from the id
        ObjectParam.posX = x;    //update ObjectParam of
the stamp
        ObjectParam.posY = y;
}
reflection(stamp){   //operate the stamp based on the
updated coordinate position
    //stamp is a stamp in the operation acceptance
state (entity of Canvas)
    var id = stamp.getAttribute("id");   //obtain the
id of the stamp
    var ObjectParam = ObjectParamArray[id];
//obtain the object parameter of the stamp in the
operation acceptance state from the id
stamp.style.position = "absolute";
    stamp.style.left = ObjectParam.posX + "px";
//move the stamp to posX
    stamp.style.top = ObjectParam.posY + "px";
//move the stamp to posX
}
```

First, ObjectParam regarding the stamp image in the operation acceptance state is specified by the update function, and information about the position is updated. In the above example, ObjectParam for each stamp image (Canvas) exists as an array in ObjectParamArray, and the ID of the stamp image is used as a suffix to specify unique ObjectParam. The method of specifying ObjectParam from the stamp image may be a method of creating an object including both Canvas and ObjectParam corresponding to the stamp image, or a method of including the entity of Canvas in ObjectParam.

Then, the reflection function performs a DOM operation based on the ObjectParam information, and changes the position of the displayed stamp image. stamp.style.left represents an x-coordinate when the upper left corner of the stamp image is set as an origin. This value is operated by JavaScript to change attribute information of the stamp image (Canvas), thereby changing the position of the displayed stamp image. By substituting ObjectParam.posX into stamp.style.left, the information of the x-coordinate updated by the update function can be reflected in DOM. In stamp.style.left, stamp represents the stamp image (Canvas), and style represents that CSS information of the stamp image is added (changed) by JavaScript. left represents an x-coordinate set in the CSS information. CSS is a language capable of changing the style of a DOM element, and the HTML display can be changed by using HTML and CSS in combination. CSS is popularly used in a scene in which HTML is used, such as Web page creation. CSS enables various operations such as change of the size and font of a character and the background color, in addition to change of the position described above. In the above-described example, change of CSS by JavaScript is performed.

Similarly, stamp.style.top represents the y-coordinate of the stamp image. By substituting ObjectParam.posY, the y-coordinate of the stamp image is changed to change the position of the displayed stamp image.

The above script description is only a description about the position for descriptive convenience. However, content operable by the reflection function is not limited to the above, and information about the size of content can also be described.

After the stamp image operation, in step S1401, the content operating unit 212 of the script layer 201 determines, based on the information obtained from the touch event unit 220 via the native layer 202, whether the touch of the screen by the user has been maintained. If the content operating unit 212 determines that the touch has not been maintained (the touch has been canceled), the processing in FIG. 14 ends. If the touch has been maintained, the process is repeated from step S1401.

This embodiment has explained only movement of the canvas by the swipe, but is not limited to this. This embodiment is applied in, for example, an operation based on a combination of a touch event and content operation, such as enlargement of a stamp image by pinch-out or translation of a drawing product in the canvas by a combination of a long tap (long press) and swipe. Pinch-out is an operation of touching the screen by two fingers of the user and then spacing them. Pinch-out is used for enlargement of an image or screen, or the like in a general portable information terminal.

The aforementioned translation indicates movement of content drawn in the canvas of the stamp image 1009, unlike movement of the canvas in the drawing area 1006. For example, when a heart in the stamp image 1009 of FIG. 10 is translated by width/2, nothing is displayed in the left half area of the stamp image 1009, and the left half of the heart is displayed in the right half of the stamp image 1009.

This embodiment uses the layered structure for the content drawing method. Each content item drawn in the layered structure holds each drawing source data item and the position and size of drawing. These pieces of information can be changed by a script, and the change can also be reflected in the display system by using these pieces of information. By utilizing this, independent content can be drawn at appropriate positions and sizes as one display image. Since rendering for printing uses original image data used for display, rendering almost free from degradation of the image quality can be implemented.

[Other Embodiment]

Each of the above embodiments has explained an arrangement in which the hybrid application operates on the portable information terminal 100. However, the embodiment is not limited to this. For example, the environment where the hybrid application operates may be a PC, a server, a game machine, or the like, in addition to the portable information terminal 100 typified by a smartphone or a tablet PC.

Although an image is selected from an image folder in a device in each of the above embodiments, the embodiment is not limited to this. It is also possible to designate the absolute path of image data, designate a folder which stores image data, or use image data captured by the camera function of a device. As for the image data obtaining destination, it is also possible to select image data on the Internet, select image data in a removable storage medium, or obtain image data by communication with an external device. The external device is, for example, a PC, a portable information terminal, or a camera.

The printer 115 in each of the above embodiments is, for example, an inkjet printer, a laser printer, a sublimation printer, or a dot impact printer. The printer 115 may be a so-called multi-function peripheral (MFP) integrally including the scanner function, the FAX function, and the like.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-135180, filed Jun. 30, 2014, which is hereby incorporated by reference herein in its entirety.

What is claimed is:

1. An information processing apparatus comprising:
   a processor;
   a storage unit configured to store an application program having a layered structure including a first layer constituted by a script instruction set which is translated to be able to be executed by said processor, and a second layer constituted by an instruction set which is translated in advance to be able to be executed by said processor, the application program executing an application by cooperation between the first layer and the second layer;
   a first display control unit configured to cause a display device, in the first layer, to display a screen in which an instruction by a user is accepted;

an image obtaining unit configured to obtain image data, in the second layer, in accordance with the instruction by the user accepted by the screen displayed by said first display control unit;

a conversion unit configured to convert a format, in the second layer, of the image data obtained by said image obtaining unit to a predetermined format which is interpretable in the first layer;

a second display control unit configured to cause the display device, in the first layer, to display an image based on the image data of which the format is converted to the predetermined format by said conversion unit;

a determination unit configured to determine rendering information, in the first layer, for rendering print target data corresponding to the displayed image displayed by said second display control unit, based on at least one of a drawing position and a size of the displayed image; and a rendering requesting unit configured to request a rendering unit, in the first layer, to render the print target data for printing, in accordance with the rendering information determined by said determination unit.

2. The apparatus according to claim 1, further comprising a change unit configured to change at least one of the drawings position and the size of the displayed image in the first layer, wherein said determination unit determines the rendering information based on the at least one of the drawing position and the size changed by said change unit.

3. The apparatus according to claim 1, wherein when said second display control unit displays a plurality of images, said determination unit determines the rendering information for each of the plurality of images.

4. The apparatus according to claim 3, wherein said rendering unit performs the rendering for each of the plurality of images.

5. The apparatus according to claim 3, wherein said rendering unit generates bitmap data based on a print resolution.

6. The apparatus according to claim 5, wherein said rendering unit further combines the generated bitmap data for each of the plurality of images.

7. The apparatus according to claim 1, wherein the first layer is described by at least one of HTML5 and JavaScript.

8. The apparatus according to claim 7, wherein when the first layer is described by JavaScript, the displayed image is drawn using a canvas.

9. An information processing method to be executed in an information processing apparatus including a processor; and a storage unit configured to store a program having an application layered structure including a first layer constituted by a script instruction set which is translated to be able to be executed by the processor, and a second layer constituted by an instruction set which is translated in advance to be able to be executed by the processor, the application program executing an application by cooperation between the first layer and the second layer, the method comprising:

a first display control step of causing a display device, in the first layer, to display a screen in which an instruction by a user is accepted;

an image obtaining step of obtaining image data, in the second layer, in accordance with the instruction by the user accepted by the screen displayed in the first display control step;

a conversion step of converting a format, in the second layer, of the image data obtained in the image obtaining step to a predetermined format which is interpretable in the first layer;

a second display control step of causing the display device, in the first layer, to display an image based on the image data of which the format is converted to the predetermined format in the conversion step;

a determination step of determining rendering information, in the first layer, for rendering print target data corresponding to the displayed image displayed in the second display control step, based on at least one of a drawing position and a size of the displayed image; and a rendering requesting step of requesting, in the first layer, a rendering unit to render the print target data for printing in accordance with the rendering information determined in the determination step.

10. A non-transitory computer-readable storage medium storing an application program having a layered structure including a first layer constituted by a script instruction set which is translated to be able to be executed by a processor, and a second layer constituted by an instruction set which is translated in advance to be able to be executed by the processor, the application program executing an application by cooperation between the first layer and the second layer, the application program for causing a computer to:

cause a display device, in the first layer, to display a screen in which an instruction by a user is accepted;

obtain image data, in the second layer, in accordance with the instruction by the user accepted by the display screen;

convert a format, in the second layer, of the obtained image data, to a predetermined format which is interpretable in the first layer;

cause the display device, in the first layer, to display an image based on the image data of which the format is converted to the predetermined format;

determine rendering information, in the first layer, for rendering print target data corresponding to the displayed image, based on at least one of a drawing position and a size of the displayed image; and request a rendering unit to render, in the first layer, the print target data for printing, in accordance with the determined rendering information.

11. The method according to claim 9, wherein at least one of the drawing position and the size of the displayed image is changed in the first layer, and in the determination step, the rendering information is determined based on at least one of the changed drawing position and the changed size.

12. The method according to claim 9, wherein when a plurality of images are displayed in the second display control step, the rendering information is determined for each of the plurality of images, in the determination step.

13. The method according to claim 12, wherein the rendering is performed for each of the plurality of images.

14. The method according to claim 12, wherein in the rendering, bitmap data is generated based on a print resolution.

15. The method according to claim 14, wherein in the rendering, the generated bitmap data for each of the plurality of images is combined.

16. The method according to claim 9, wherein the first layer is described by at least one of HTML5 and JavaScript.

17. The method according to claim 16, wherein when the first layer is described by JavaScript, the displayed image is drawn using a canvas.

18. The apparatus according to claim 1, wherein said determination unit determines the rendering information indicating a degree of scaling of the print target data when the rendering is performed, based on the size of the displayed image.

19. The method according to claim 9, wherein in the determination step, the rendering information indicating a degree of scaling of the print target data when the rendering is performed, is determined, based on the size of the displayed image.

20. The method according to claim 9, wherein the rendering unit is OS.

* * * * *